United States Patent
Sachter-Zeltzer et al.

(10) Patent No.: US 10,423,314 B2
(45) Date of Patent: Sep. 24, 2019

(54) USER INTERFACE WITH QUANTUM CURVES AND QUANTUM ARCS

(71) Applicant: Google LLC, Mountain View, CA (US)

(72) Inventors: Ariel Sachter-Zeltzer, Sunnyvale, CA (US); Peter Ng, Mountain View, CA (US); Gustavo Sonoda, San Francisco, CA (US)

(73) Assignee: Google LLC, Mountain View, CA (US)

( * ) Notice: Subject to any disclaimer, the term of this patent is extended or adjusted under 35 U.S.C. 154(b) by 150 days.

(21) Appl. No.: 15/317,790

(22) PCT Filed: Jun. 23, 2015

(86) PCT No.: PCT/US2015/037149
§ 371 (c)(1),
(2) Date: Dec. 9, 2016

(87) PCT Pub. No.: WO2015/200303
PCT Pub. Date: Dec. 30, 2015

(65) Prior Publication Data
US 2017/0102858 A1 Apr. 13, 2017

Related U.S. Application Data

(60) Provisional application No. 62/016,636, filed on Jun. 24, 2014.

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0486* (2013.01); *G06F 3/04812* (2013.01);
(Continued)

(58) Field of Classification Search
CPC ..................................................... G06F 17/50
See application file for complete search history.

(56) References Cited

U.S. PATENT DOCUMENTS 6,650,328 B1* 11/2003 Hobbs ................... G06T 11/203
345/442
2004/0239693 A1* 12/2004 Mullen ................. G06T 11/206
345/677

(Continued)

FOREIGN PATENT DOCUMENTS

WO  WO 2014/014242  1/2014

OTHER PUBLICATIONS

International Search Report for PCT/US2015/037149 dated Sep. 2, 2015—4 pages.

(Continued)

*Primary Examiner* — Claudia Dragoescu
(74) *Attorney, Agent, or Firm* — McDonnell Boehnen Hulbert & Berghoff LLP

(57) ABSTRACT

Systems, methods, and computer-readable media are provided for generating an arced path of travel for a user interface element. In accordance with one implementation, a method is provided that includes operations performed by at least one processor. The operations of the method include determining coordinates for a start point and an end point of the user interface element corresponding to locations on a user interface. The method may also include determining a minimum arc angle and a maximum arc angle for an arc. Additionally, the method may generate an arced path based on the start point coordinates, the end point coordinates, the minimum arc angle, and the maximum arc angle. The method may also generate commands that move the user interface element along the arced path in the user interface.

20 Claims, 5 Drawing Sheets

(51) Int. Cl.
*G06F 3/0486* (2013.01)
*G06F 3/0481* (2013.01)
*G06T 11/20* (2006.01)

(52) U.S. Cl.
CPC ...... *G06F 3/04817* (2013.01); *G06F 3/04842* (2013.01); *G06T 11/203* (2013.01)

(56) References Cited

U.S. PATENT DOCUMENTS

| | | | |
|---|---|---|---|
| 2007/0124697 A1 | 5/2007 | Dongelmans | |
| 2008/0062177 A1* | 3/2008 | Gaul | G06T 11/203 345/440 |
| 2011/0055773 A1* | 3/2011 | Agarawala | G06F 3/016 715/863 |
| 2012/0306891 A1* | 12/2012 | Shaffer | G06T 13/00 345/473 |
| 2013/0159914 A1* | 6/2013 | Grigoryev | G06F 3/0488 715/776 |
| 2013/0227469 A1* | 8/2013 | Park | G06F 3/0481 715/788 |
| 2014/0053113 A1* | 2/2014 | Zoon | G06F 3/017 715/863 |

OTHER PUBLICATIONS

Rekimoto, "Pick-and-Drop: A Direct Manipulation Technique for Multiple Computer Environments", 10$^{th}$ Annual Symposium on User Interface Software and Technology, Alberta, Canada, Oct. 14-17, 1997, pp. 31-39.

\* cited by examiner

USER INTERFACE WITH QUANTUM CURVES AND QUANTUM ARCS

CROSS-REFERENCE TO RELATED APPLICATION(S)

This application is a 371 of international application PCT/US2015/037149 filed on Jun. 23, 2015 which also claims the benefit of U.S. Provisional Patent Application No. 62/016,636, filed Jun. 24, 2014, the contents of which are expressly incorporated herein by reference in their entirety.

BACKGROUND

The present disclosure relates generally to the field of user interfaces and computerized animation of user interface elements. More particularly, and without limitation, the present disclosure described embodiments of methods, systems, and computer readable media for generating an arced path of travel for user interface elements.

User interface elements, such as icons, windows, and widgets, are pervasive in modern user interfaces for computers, laptops, smartphones, personal digital assistants, and other devices. In some instances, user interface elements may move from one location to another in a user interface. For example, a device may automatically rearrange icons on a display screen based on alphabetical order or frequency of usage.

Traditional computing interfaces often move or animate user interface elements using linear paths. For example, when shifting an icon from one location to another, the shortest path, a straight line, is used to move from the start point to the end point.

SUMMARY

In accordance with embodiments of the present disclosure, computer-implemented systems, methods, and computer-readable media are provided for generating an arced path of travel for a user interface element.

In accordance with one embodiment, a computerized method is provided that includes operations performed by at least one processor. The operations of the method may include determining coordinates for a start point and an end point of the user interface element corresponding to locations on a user interface. The method may also include determining a minimum arc angle and a maximum arc angle for an arc. Additionally, the method may generate an arced path based on the start point coordinates, the end point coordinates, the minimum arc angle, and the maximum arc angle. The method may also generate commands to move or animate the user interface element along the arced path in the user interface.

In an embodiment, the method may include generating a velocity profile that represents the speed at which the user element moves along the arced path based on the arc path distance and the slope of the arced path. The commands may move or animate the user element at speeds corresponding to the velocity profile.

In an embodiment, the method may determine a concavity for the arc. The arced path may be generated further based on the concavity.

The minimum arc angle, the maximum arc angle, and the concavity may be based on at least one or more of stored user preferences, system default settings, a size of the user interface, and an orientation of the user interface. Also, the arced path may be generated responsive to a determination that the coordinates for the start point and end point to not align vertically. Additionally, the minimum arc angle and the maximum arc angle may be modified to avoid crossing an existing arced path for another user interface element. The coordinates for the start point and the end point may correspond to a location of a centroid of the user interface element.

Computer-readable media and systems are also provided in this disclosure for generating an arced path of travel for a user interface element. Additional embodiments and related features of the present disclosure are described herein.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments.

DETAILED DESCRIPTION OF EXAMPLE EMBODIMENTS

Embodiments of the present disclosure will now be described. Further embodiments are disclosed in FIGS. 1-5, which may be implemented together or individually.

Embodiments of the present disclosure are generally directed to systems, methods, and computer-readable media for determining an arced path of travel for a user interface element. According to certain embodiments, a user interface (e.g., a monitor, display, touchscreen, window, container, etc.) is provided with at least one user interface element (e.g., an icon, button, controls, label, menu item, text, text field, binary field, image, video, highlight, etc.), For example, a smartphone having a touchscreen could display a row of icons. A user may select (e.g., through interacting with the touchscreen) a new location for one of the icons. In moving the icon to the new location, the user interface may use a determined circular arced path to simulate natural movement.

A user interface may include any human-computer interface that allows a user interact with a computing device, such as a graphical user interface (GUI). An example user interface may allow a user to control a computing device and receive feedback from a computing device. For example, a user interface may receive input from a user and provide output to a user. An example user interface may allow a user to enter data. For example, a user interface may include selectable numbers or a keyboard for entering a phone number in a computer. An example user interface may respond to user input. For example, a user interface may highlight text, responsive to a user selection. A user interface may include one or more user interface elements of various types.

A user interface element may be any part, portion, or component of a user interface. Example user interface elements may include, for example, an icon, button, window, control, widget, label, menu, menu item, text, text field, binary field, image, or video. A user interface element may identify an area to receive input from a user, provide output to a user, or a combination of the two. For example, a user interface may include an element to provide input, such as entering a number or pressing an arrow to increase a value (e.g., volume of system audio, contrast of a display, a scroll bar for a window, etc.). An example output user interface element may include, for example, a field to display data from sensors, such as a graph showing power consumption over time or displaying the time of day. User interface elements may act as mechanisms to both receive user input and provide output for a user. For example, an icon may be selectable by a user to launch a program. When the icon is selected it may be highlighted by the interface (e.g., outlined, colored, bolded, etc.), providing confirmation to the user of the input that was received.

Figure 1:
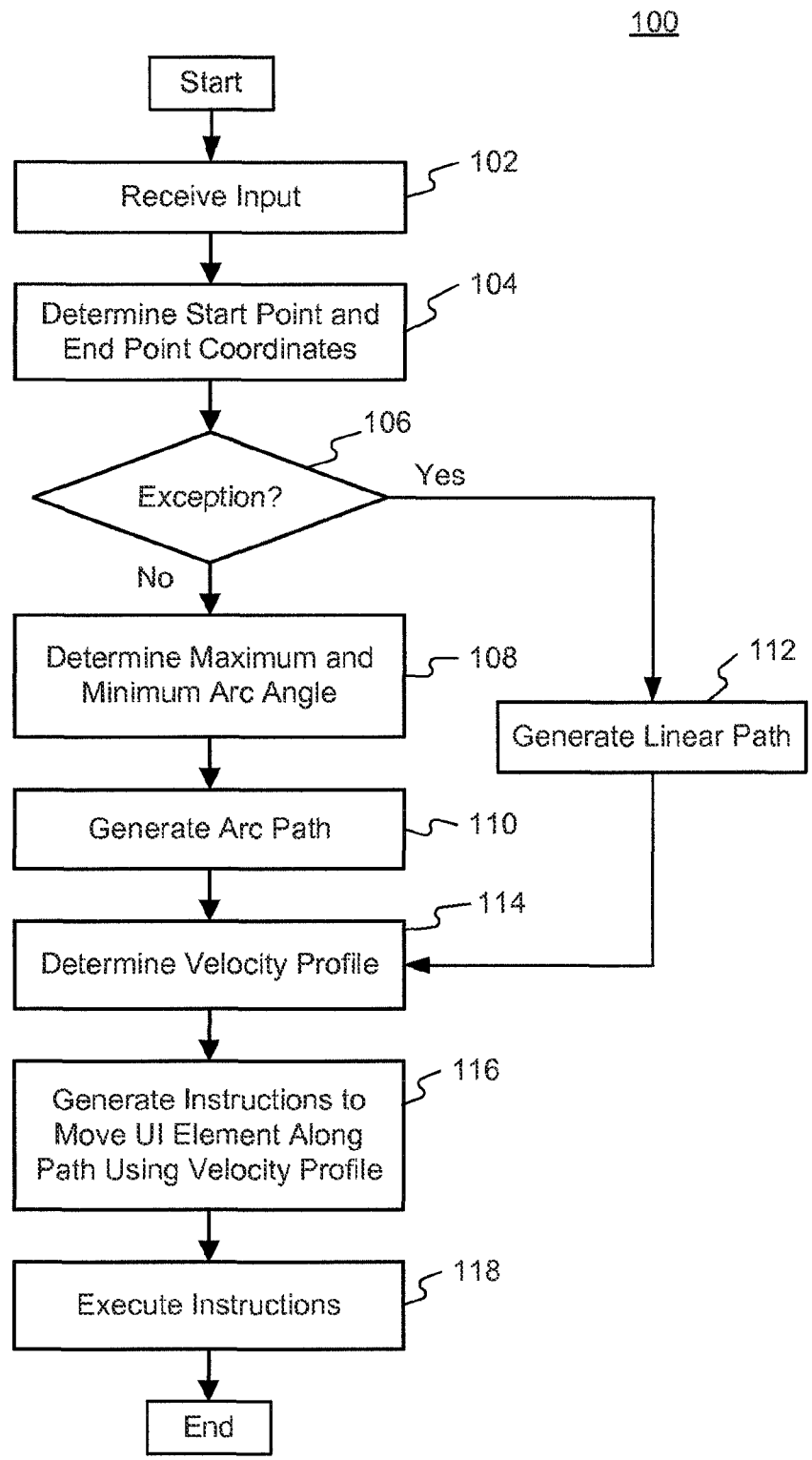
FIG. 1 illustrates a flowchart of an example arced travel path process, consistent with embodiments of the present disclosure.

FIG. 1 illustrates a flowchart of an example arced travel path process 100, consistent with embodiments of the present disclosure. As described below, example process 100 may be implemented with one or more of the components illustrated in FIG. 5, but other arrangements and implementations are possible. Additionally, the process steps may be performed using one or more processors, storage devices, and user interfaces. It should be understood that the steps of process 100 may be performed in any order to achieve the objects of the disclosure and the depicted order of FIG. 1 is merely an example.

In step 102, a processor may receive input. In an embodiment, the input may correspond to a user input via an input device. For example, a user may select a location on a user interface by clicking a mouse or pressing a touchscreen. Other input devices may be used by a user, such as a trackball, keyboard, stylus, camera, microphone, or joystick, for example. For example, a user may press arrow keys on a keyboard to highlight a certain icon in a user interface. In an embodiment, an application may provide input, such as an application highlighting a particular user interface element. For example, a "how-to" tutorial application may provide input to the user interface to highlight a particular menu item. In another example, a user may provide input selecting a widget to expand, such as a widget displaying the weather. The processor may move surrounding user interface elements (e.g., widgets and icons) to make room for the expanded weather widget. Any input that may be correlated to a location on a user interface may be used.

In step 104, the processor may determine a start point and end point coordinates for a user interface element. The start point and end point may be directly conveyed or derived from the received input (step 102). For example, the input may be a user selecting an icon and then selecting a new location for the icon. The input directly may identify the icon, which may be used to derive the start point, as well as directly indicating the end point. In an embodiment, the start point and end point are received from a programming interface, such as a user interface action requiring the movement of one or more user interface elements. For example, the user may select to expand a weather widget. The processor may determine that when the weather widget is expanded, it will overlap two icons. The processor may further determine that the icons should be moved, as well as the new locations to which the icons should be moved to get out of the way of the weather widget expansion. The current position of the icons may be the corresponding start point coordinates, while the determined new locations may be the respective end points.

In step 106, a processor may determine whether the start point and end point coordinates fall into an exception. Certain relative positions may not use an arced path of travel. For example, when the start point and end point are vertically aligned, it may be preferable or improve the user experience to use a straight path of travel, dropping down in a straight path or rising in a straight path. This may allow the user interface to simulate the appearance of a falling object.

In an embodiment, the processor may take into account the orientation of the user interface when determining the exception. For example, when a tablet is held horizontally in the air, the coordinates that fall in a vertical alignment exception are actually horizontally aligned on an unadjusted user interface axis. In an embodiment, when the processor determines that the user interface is lying flat on a surface (e.g., a table, desk, etc.), the processor may not trigger any exceptions and, instead, may determine arced paths. This behavior may simulate the chaotic movement of drops of water on a flat surface, moving in curves rather than straight lines. The processor may determine the orientation using one or more sensors, including, for example, an accelerometer or an ambient light sensor.

In step 108, the processor determines the maximum and minimum arc angle for the arced path of travel. The processor may identify maximum and minimum arc angles stored in system settings or user preferences. For example, the processor may query user preferences to determine whether minimum and maximum arc angle settings exist and what their corresponding values are.

In an embodiment, the processor may determine the minimum and maximum arc angles based on the orientation of the user interface, the spacing between the start point and endpoint, and the size of the user interface. For example, more gently sloping arcs may be used when the user interface is held vertically, while more sharply arced curves may be used when the user interface orientation is at less steep angle. In another example, when the start point and end point are close together, the processor may determine a lower maximum arc angle to ensure that the path is smooth, without a sharp curve. The processor may also use the size of the user interface when determining the maximum and minimum arc angles. The size of the display may require that sharper curves be used to accommodate smaller user interface sizes. For example, the processor may determine the resolution of the display used to provide the user interface (e.g., 320 pixels by 240 pixels). The processor may increase the maximum arc angle when the display is smaller to accommodate the smaller space for moving user interface elements.

In step 110, the processor may generate an arced path of travel for a user interface element. The processor may determine the geometry for an arced path by fitting the start point and end point on the perimeter of a circle. For example, the processor may calculate a center of a circle from the start point and end point using geometric principles. The processor may calculate the angle formed between start point the center of the circle and the end point to determine the arc angle. The processor may then determine if the existing arc angle is within the bounds of the minimum arc angle and maximum arc angle (e.g., from step 108). The processor may modify the circle by moving the center while maintain the start and end points on the perimeter to increase or decrease the arc angle of the arc between the start point and end point.

In an embodiment, the processor may determine the concavity of the arced path. The processor may receive system settings indicating rules or preferences for the concavity. For example, the user may enter settings to make all paths concave-up. The processor may determine concavity based on the orientation of the user interface. The processor may receive signals from sensors indicating the orientation of the user interface. The processor may then generate an arc path that is concave-up relative to the orientation of the user interface, so that the user interface may always display a concave-up arc path regardless of how the user interface is pitched.

When, in step 106, the processor determines that the relative position of start point and end points fall into in an exception, in step 112, the processor may generate a linear or straight-line path. In some embodiments, the processor may generate a straight-line path from the start point to the end point. For example, when the end point falls directly below the start point, the processor may determine a path straight down with all x-coordinates of the path being the same.

In step 114, the processor may determine a velocity profile for the movement of the user interface element along the path (e.g., the path generated in step 110 or step 112). The velocity profile may be a representation of the magnitude of the velocity of the user interface element at points along the path. The velocity profile may be static, moving the user interface element at the same speed from the start point to the end point. The velocity profile may accelerate linearly or exponentially. The velocity profile may taper and slow as the user interface element approaches the end point.

In an embodiment, the processor determines the velocity profile based on the slope of the path, the orientation of the user interface, and/or system settings (e.g., user preferences). The processor may determine a perceived slope based on the slope of the path and the angle of the user interface orientation. For example, the processor may generate a velocity profile that may increase more rapidly when the path is steeply curved or the user interface is held vertically. The processor may use the perceived slope to generate a velocity profile that may emulate the natural acceleration provided by earth's gravitational forces.

In step 116, the processor generates instructions to move or animate the user interface element along the path (e.g., the path generated in step 110 or step 112) using the velocity profile (e.g., the velocity profile determined in step 114). The instructions may be a set of commands that indicate the user interface element, the path of travel, and the speed at which the user interface element travels. The processor may describe the path of travel using listing a sequence of points to move to or by defining the geometric elements that make up the path. For example, the path may be described as an arced path based on a circle centered at (100, 300) with a radius of 50; the start point is (100, 250); the arc extends 90 degrees counterclockwise.

In an embodiment, the processor generates instructions indicating the velocity at which the user interface element should move. The velocity instructions may indicate the velocity at various points along the path. The processor may generate a command indicating the velocity profile as a function of distance or time. For example, the processor may command "velocity (distance)=−1*(distance)^2+10." The velocity may be indicated in units of pixels per second.

In an embodiment, the processor may combine the instructions for the path and velocity by using commands based on a series of vectors indicating the direction and acceleration of the user interface element.

In step 118, the processor may execute instructions (e.g., the instructions generated in step 116). The instructions may cause a user interface element to move on the user interface from the start point to the end point. For example, an icon for a web browser may move in an arc to a new location after a weather widget expands into the area where the icon was originally located.

Process 100 may be applied to multiple simultaneous user interface element travel paths, such as when two or more user interface elements may be shifted at the same time. For example, two icons may be shifted at the same time in the user interface. When generating the paths of travel for each icon (e.g., step 110 and step 112), the processor may determine if the paths will intersect and whether either path should be modified. In an embodiment, the processor may adjust the arc angle or velocity profile to avoid intersecting paths or collisions as the user interface elements. For example, the processor may generate a velocity profile that delays the acceleration of one user interface element so that it will not directly collide with another user interface element as it moves along its path of travel. In another example, the processor may increase or decrease the arc angle of a curved path of travel to avoid paths crossing. For example, a curved path of travel may turn more tightly to avoid another path of travel.

In an embodiment, the processor may disregard collisions or path intersections when calculating paths of travel and velocity profiles for multiple user interface elements. The elements may move "through" or "over" each other without modifying instructions for each user interface element that ay be generated without taking into account the other user interface elements.

The processor may receive and store user-defined preferences in system settings. By way of example, the system settings may determine exceptions (step 106), maximum and minimum arc angle (step 108), path behavior when multiple paths intersect (step 110 and step 112, as discussed above), and the velocity profile (step 114), for example. The user interface may receive user input which is sent to the processor to interpret and modify specific settings, including the examples previously listed. For example, the user may enter "90 degrees" into a text field for the maximum arc angle.

Figure 2:
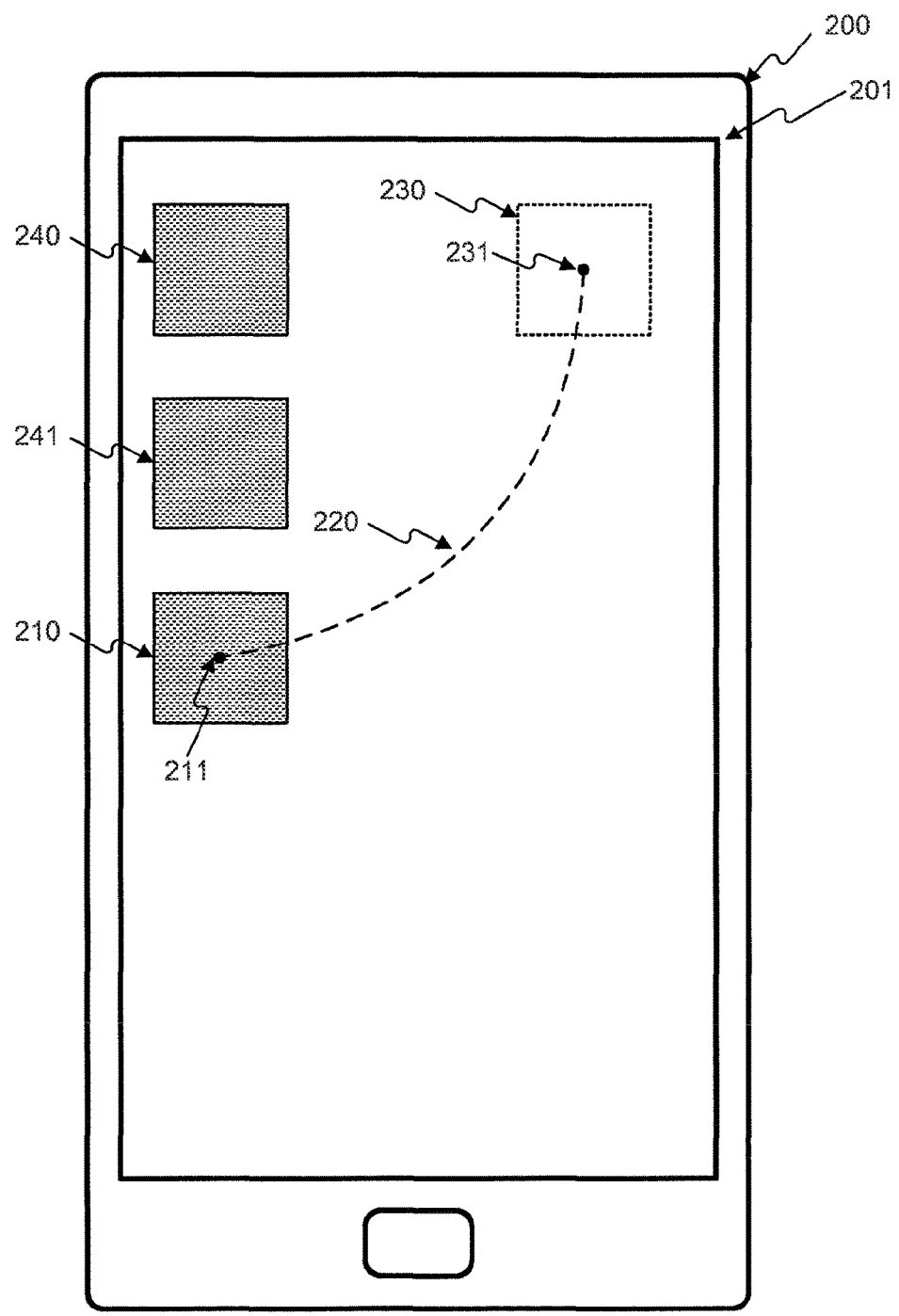
FIG. 2 illustrates a diagram of an example user interface with an arced path, consistent with embodiments of the present disclosure.

FIG. 2 illustrates a diagram of an example user interface 201 of a handheld device or system 200, consistent with the embodiments of the present disclosure. As shown in FIG. 2, system 200 may include user interface 201. User interface may be a graphical user interface (GUI), including one or more user interface elements (e.g., first user interface element 210, second user interface element 241, and third user interface element 240). For example, user interface 201 may be the touchscreen of a smartphone including multiple icons that may be selected to launch applications. The user interface may include other user interface elements, including those described above.

The user interface elements may have a center or centroid (e.g., first user interface element centroid 211). The coordinates of the centroid of a user interface element may represent the location of the user interface element, such as the user interface element location used in the steps of process 100 described above. The centroid may be calculated by the processor or self-determined by the properties of the user interface element. For example, first user interface element 210 may include a list of properties that may include the coordinates of the centroid of the header. Other non-centroid coordinates may be used as the location of the user interface element for purposes of the processes described. The start point of a user interface element may be the centroid of the user interface element that is identified for movement.

User interface 201 may receive input indicating end point 231 corresponding to destination location 230. For example, a user may press a touchscreen and the location may be recorded by the touchscreen and sent to the processor in accordance with step 102 and step 104 of process 100. Other forms of input may be used, such as a stylus, mouse, keyboard, and a trackball, for example. In an embodiment, an application or routine may identify end point 231.

In accordance with step 108 and step 110, the processor may generate arced path 220. The arced path may be based on, for example, the size and orientation of user interface 201.

As depicted in the example embodiment depicted in FIG. 2, arced path 220 may be concave-up. The concavity of arced path 220 may be determined to avoid intersecting with other user interface elements, such as second user interface element 241. Arced path 220 may be curved more or less sharply based on system settings or user preferences corresponding to a minimum arc and a maximum arc angle.

Figure 3:
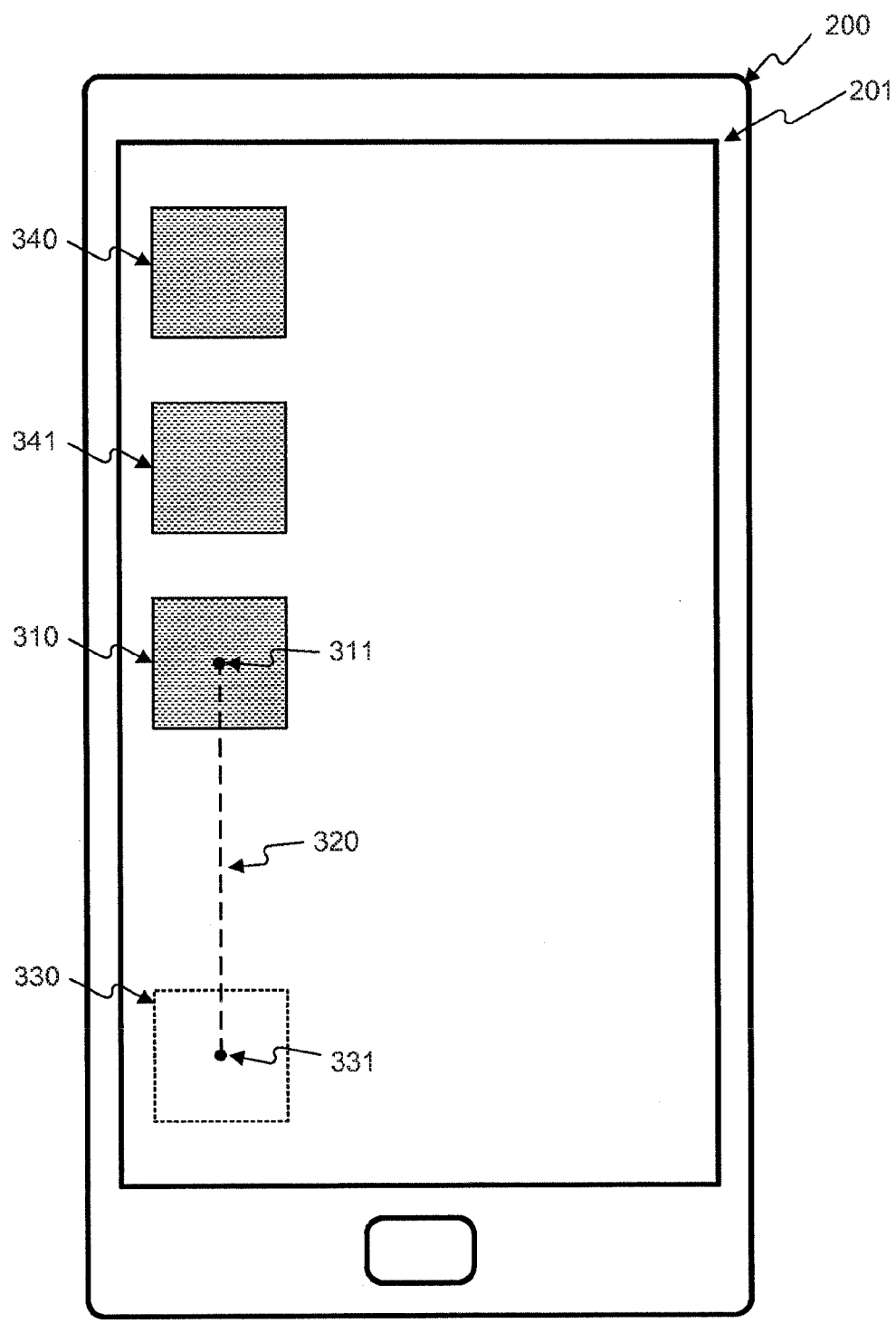
FIG. 3 illustrates a diagram of an example user interface with an exception path, consistent with embodiments of the present disclosure.

FIG. 3 illustrates a diagram of an example user interface 201 of a handheld device or system 200, consistent with the embodiments of the present disclosure. As shown in FIG. 3, system 200 may include user interface 201. User interface 201 may be a graphical user interface (GUI), including one or more user interface elements (e.g., first user interface element 310, second user interface element 341, and third user interface element 340). For example, user interface 201 may be the touchscreen of a smartphone including multiple icons that may be selected to launch applications. The user interface may include other user interface elements, including those described above.

The user interface elements may have a center or centroid (e.g., first user interface element centroid 311). The coordinates of the centroid of a user interface element may represent the location of the user interface element, such as the user interface element location used in the steps of process 100 described above. As previously described, the centroid may be calculated by the processor or self-determined by the properties of the user interface element. The start point of a user interface element may be the centroid of the user interface element that is identified for movement.

User interface 201 may receive input indicating end point 331 corresponding to destination location 330. For example, a user may press a touchscreen and the location may be recorded by the touchscreen and sent to the processor in accordance with step 102 and step 104 of process 100. Other forms of input may be used, such as a stylus, mouse, keyboard, hand gestures, eye gaze, and a trackball, for example. In an embodiment, an application or routine may identify end point 331.

In accordance with step 106 and step 112, the processor may generate exception path 320. The first user interface element centroid 311 (e.g., the start point) and end point 331 are located above each other. The processor may determine that this relative location is an exception to using an arced path and generate exception path 320, which is linear.

In an embodiment, the exception determination (step 106) may take into account the surrounding user interface elements, including any potential intersections, in determining if the processor should generate a linear path. For example, if third user interface element 340 were to move to destination location 330, the processor would determine that they are vertically aligned. However, if a linear path was used, the exception path would intersect seconder user interface element 341 and first user interface element 310. The processor may then override the exception and generate an arc path to avoid intersecting the surrounding user interface elements. Other exceptions may be triggered to avoid collisions. In other embodiments, the processor may ignore intersections when generating paths (step 110 and step 112) and determining exceptions (step 106).

Figure 4:
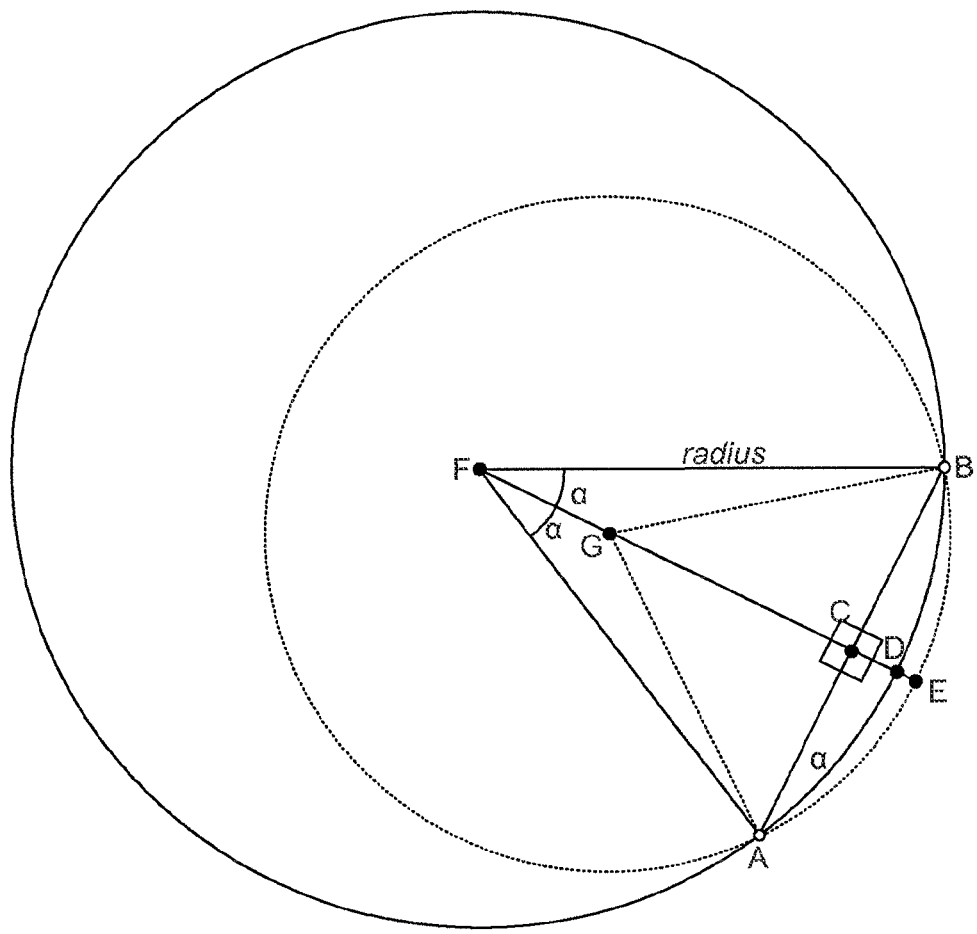
FIG. 4 illustrates a diagram of the geometry of an example arced path, consistent with the embodiments of the present disclosure.

FIG. 4 illustrates example geometry for determining an arced path. Two different arced paths are depicted for traveling from point A to point B. Arc ADB is a part of circle F. Arc AEB is part of circle G. As the radius of the circle which serves as the basis for the arc decreases the arc angle of the path from A to B increases. For example, angle AFB is less than angle AGB. As the center of the circle moves from points F or G closer to point C, the arc angle increases. When the processor generates the arc path (step 110), the processor may generate a plurality of potential circles to derive multiple arcs. The processor may eliminate arcs that have an arc angle outside the limits of the maximum arc angle and the minimum arc angle. The processor may eliminate potential arc paths based on potential intersections with other concurrent paths or user interface elements. Even if the center of the circle on which the arc is based is extremely far away from points A and B, the resulting path between A and B will still be curved, even if only slightly. When a straight path is desirable, the processor may determine an exception (step 106) and generate a linear path (step 112) instead of using the arc path calculation.

Figure 5:
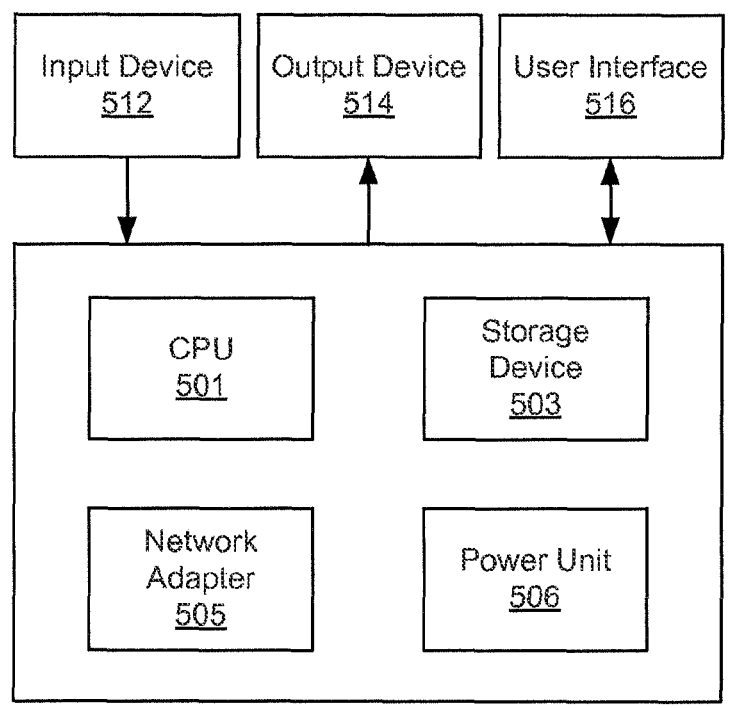
FIG. 5 illustrates an example system for implementing embodiments of the present disclosure.

FIG. 5 illustrates an example system 200 for implementing embodiments consistent with the present disclosure. Variations of system 200 may be used for implementing components or devices of the disclosed embodiments. System 200 may be, for example, a desktop computer, a laptop computer, a tablet computer, a hybrid tablet-laptop, a smartphone, a wrist-held device, a set-top box, or a television. It will be appreciated that the components and features represented in FIG. 5 may be duplicated, omitted, or modified.

As shown in FIG. 5, an example system 500 may include a central processing unit 501 (also referred to as an electronic processor or CPU) for managing and processing data, and performing operations, consistent with the present disclosure. (CPU 501 may be implemented as one or more processors.) System 500 may also include one or more storage device 503. Storage device 503 may comprise optical, magnetic, signal, and/or any other type of storage device. System 500 may also include network adapter 505. Network adapter 505 may allow system 500 to connect to electronic networks, such as the Internet, a local area network, a wide area network, a cellular network, a wireless network, or any other type of network. System 500 also includes power unit 506, which may enable system 500 and its components to receive power and operate fully.

In some embodiments, system 500 may also include input device 512, which may receive input from users and/or modules or devices. Such modules or devices may include, but are not limited to, keyboards, mice, trackballs, track pads, scanners, cameras, and other devices which connect via Universal Serial Bus (USB), serial, parallel, infrared, wireless, wired, or other connections. System 500 also includes output device 514, which transmit data to users and/or modules or devices, Such modules or devices may include, but are not limited to, computer monitors, televisions, screens, projectors, printers, plotters, and other recording/displaying devices which connect via wired or wireless connections.

System 500 may include user interface 516, which may facilitate interaction with a user. Example user interfaces may include, for example, touch screens (e.g., a resistive or capacitive touchscreen), displays (e.g., a LCD monitor), LED arrays, or any other display.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

It is to be understood that both the foregoing general description provides examples and explanations only, and are not restrictive. Further, the accompanying drawings, which are incorporated in and constitute a part of this specification, illustrate embodiments of the present disclosure and together with the description, and are similarly not restrictive.

What is claimed:

1. A computer-implemented system for generating an arced path of travel for a user interface element, comprising:
    a memory device that stores instructions; and
    at least one processor that executes the instructions to:
        determine coordinates for a start point and an end point of the user interface element corresponding to different locations on a user interface;
        determine a minimum arc angle and a maximum arc angle for an arc based on an orientation of the user interface, wherein the orientation of the user interface is measure with respect to a plane of the surface of the user interface and the ground, and wherein a steepness of the arc is inversely proportional to the interface orientation angle;
        generate an arced path based on the start point coordinates, the end point coordinates, the minimum arc angle, and the maximum arc angle; and
        generate commands that move the user interface element along the arced path in the user interface.

2. The computer-implemented system according to claim 1, wherein the instructions further cause the processor to:
    generate a velocity profile that represents the speed at which the user interface element moves along the arced path based on the arc path distance and the slope of the arced path,
    wherein the commands move the user interface element at speeds corresponding to the velocity profile.

3. The computer-implemented system according to claim 1, wherein the instructions further cause the processor to:
    determine a concavity for the arc,
    wherein the arced path is generated further based on the concavity.

4. The computer-implemented system according to claim 3, wherein the minimum arc angle, the maximum arc angle, and the concavity are based on at least one or more of stored user preferences, system default settings, and a size of the user interface.

5. The computer-implemented system according to claim 1, wherein the arced path is generated responsive to a determination that the coordinates for the start point and end point do not align.

6. The computer-implemented system according to claim 1, wherein the minimum arc angle and the maximum arc angle are modified to avoid crossing an existing arced path for another user interface element.

7. The computer-implemented system according to claim 1, wherein the coordinates for the start point and the end point correspond to a location of a centroid of the user interface element.

8. A method for generating an arced path of travel for a user interface element, the method comprising the following operations performed by at least one processor:
    determining coordinates for a start point and an end point of the user interface element corresponding to different locations on a user interface;
    determining a minimum arc angle and a maximum arc angle for an arc based on an orientation of the user interface, wherein the orientation of the user interface is measure with respect to a plane of the surface of the user interface and the ground, and wherein a steepness of the arc is inversely proportional to the interface orientation angle;
    generating an arced path based on the start point coordinates, the end point coordinates, the minimum arc angle, and the maximum arc angle; and
    generating commands that move the user interface element along the arced path in the user interface.

9. The method according to claim 8, further comprising the following operations performed by the at least one processor:
    generating a velocity profile that represents the speed at which the user interface element moves along the arced path based on the arc path distance and the slope of the arced path,
    wherein the commands move the user interface element at speeds corresponding to the velocity profile.

10. The method according to claim 8, further comprising the following operations performed by the at least one processor:
    determining a concavity for the arc,
    wherein the arced path is generated further based on the concavity.

11. The method according to claim 8, wherein the minimum arc angle, the maximum arc angle, and the concavity are based on at least one or more of stored user preferences, system default settings, and a size of the user interface.

12. The method according to claim 8, wherein the arced path is generated responsive to a determination that the coordinates for the start point and end point to not align.

13. The method according to claim 8, wherein the minimum arc angle and the maximum arc angle are modified to avoid crossing an existing arced path for another user interface element.

14. The method according to claim 8, wherein the coordinates for the start point and the end point correspond to a location of a centroid of the user interface element.

15. A non-transitory, computer-readable medium storing instructions, the instructions configured to cause at least one processor to perform operations comprising:
    determine coordinates for a start point and an end point of the user interface element corresponding to different locations on a user interface;
    determine a minimum arc angle and a maximum arc angle for an arc based on an orientation of the user interface, wherein the orientation of the user interface is measure with respect to a plane of the surface of the user interface and the ground, and wherein a steepness of the arc is inversely proportional to the interface orientation angle;

generate an arced path based on the start point coordinates, the end point coordinates, the minimum arc angle, and the maximum arc angle; and generate commands that move the user interface element along the arced path in the user interface.

16. The computer-readable medium of claim 15, wherein the instructions are further configured to cause at least one processor to perform operations comprising:

generate a velocity profile that represents the speed at which the user interface element moves along the arced path based on the arc path distance and the slope of the arced path, wherein the commands move the user interface element at speeds corresponding to the velocity profile.

17. The computer-readable medium of claim 15, wherein the instructions are further configured to cause at least one processor to perform operations comprising:

determine a concavity for the arc, wherein the arced path is generated further based on the concavity.

18. The computer-readable medium of claim 15, wherein the minimum arc angle, the maximum arc angle, and the concavity are based on at least one or more of stored user preferences, system default settings, and a size of the user interface.

19. The computer-readable medium of claim 15, wherein the arced path is generated responsive to a determination that the coordinates for the start point and end point to not align.

20. The computer-readable medium of claim 15, wherein the minimum arc angle and the maximum arc angle are modified to avoid crossing an existing arced path for another user interface element.

\* \* \* \* \*